US007112787B2

(12) United States Patent
Mordehal

(10) Patent No.: US 7,112,787 B2
(45) Date of Patent: Sep. 26, 2006

(54) ION TRAP MASS SPECTROMETER AND METHOD FOR ANALYZING IONS

(75) Inventor: Alex Mordehal, Santa Clara, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 73 days.

(21) Appl. No.: 10/807,848

(22) Filed: Mar. 24, 2004

(65) Prior Publication Data

US 2004/0178341 A1 Sep. 16, 2004

Related U.S. Application Data

(63) Continuation of application No. 10/323,391, filed on Dec. 18, 2002, now abandoned.

(51) Int. Cl.
*H01J 49/34* (2006.01)
*H01J 49/00* (2006.01)
*B01D 59/44* (2006.01)

(52) U.S. Cl. ...................... 250/292; 250/291; 250/281; 250/282; 250/288

(58) Field of Classification Search ..................... None
See application file for complete search history.

(56) References Cited

U.S. PATENT DOCUMENTS 4,736,101 A 4/1988 Syka et al.
4,818,869 A 4/1989 Weber-rabau
5,075,547 A 12/1991 Johnson et al.
5,107,109 A 4/1992 Stafford, Jr. et al.
RE34,000 E 7/1992 Syka et al.
5,128,542 A 7/1992 yates et al.
5,298,746 A 3/1994 Franzen et al.
5,324,939 A 6/1994 Louris et al.
5,397,894 A 3/1995 Wells et al.
5,448,061 A 9/1995 Wells
5,468,958 A 11/1995 Franzen et al.
5,479,012 A 12/1995 Wells
5,517,025 A 5/1996 Wells et al.
5,521,380 A 5/1996 Wells et al.
5,559,325 A 9/1996 Franzen
5,572,022 A 11/1996 Schwartz et al.
5,572,025 A 11/1996 Cotter et al.
5,608,216 A 3/1997 Wells et al.
5,654,542 A 8/1997 Schubert et al.
5,689,111 A 11/1997 Dresch et al.
5,710,427 A 1/1998 Schubert et al.
5,714,755 A 2/1998 Wells et al.
5,729,014 A 3/1998 Mordehai et al.
5,756,996 A 5/1998 Bier et al.
5,793,038 A 8/1998 Buttrill, Jr.
5,818,055 A 10/1998 Franzen
5,825,027 A 10/1998 Takada et al.
5,903,003 A 5/1999 Schubert et al.
5,936,241 A 8/1999 Franzen et al.
6,080,985 A 6/2000 Welkie et al.
6,121,610 A 9/2000 Yoshinari et al.
6,124,591 A 9/2000 Schwartz et al.
RE36,906 E 10/2000 Franzen et al.
6,147,348 A 11/2000 Quarmby et al.

(Continued)

*Primary Examiner*—Nikita Wells

(57) ABSTRACT

A mass spectrometer having an ionization source, a ion trap mass analyzer, an ion guide and gating apparatus between the ion guide and the ion trap. The gating apparatus includes sealing apparatus. A stream of ions from the ion source are guided to through the gating apparatus in pulses to the ion trap. The number of ions in each pulse are controlled by the scaling apparatus.

30 Claims, 2 Drawing Sheets

U.S. PATENT DOCUMENTS 6,194,716 B1 2/2001 Takada et al.
6,294,780 B1 9/2001 Wells et al.
6,914,242 B1 * 7/2005 Mordehai .................. 250/288
2004/0119014 A1 * 6/2004 Mordehai .................. 250/290
2005/0194529 A1 * 9/2005 Mordehai .................. 250/287

* cited by examiner

ION TRAP MASS SPECTROMETER AND METHOD FOR ANALYZING IONS

CROSS-REFERENCE TO RELATED APPLICATIONS

This application claims the benefit under 35 U.S.C. §120 of prior U.S. application Ser. No. 10/323,391, filed Dec. 18, 2002; now abandoned, which is hereby incorporated by reference.

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

This invention relates to the filed of analytical instrumentation, and more particularly, to the field of ion trap mass spectrometry.

In the field of ion trap mass spectrometry, it is common to sample ions generated by an external ion source into a quadrupole ion trap mass analyzer or into an ion cyclotron resonance mass analyzer. In both cases, an ion transfer optics is used to deliver ions from an ion source into an ion trap mass analyzer. In a prior art device, the polarity of a voltage applied to each of electrodes is selected depending on the polarity of ions to be analyzed. A sample solution is introduced to a spraying device.

Ion trap mass analyzers have a finite capacity with respect to the total number of ions that can be analyzed in one cycle, so it is necessary to gate the ion source. The gating function is usually performed by pulsing voltage on one or several elements in the ion transfer optics.

In the analytical applications, the flux of the ions into an ion trap is unknown in advance since the concentration of the analyzed sample can vary. Moreover, ion trap mass analyzers are frequently connected with a sample separation technique such as gas chromatography or liquid chromatography. In this case, sample concentration is changed in time by more than three orders of magnitude. Several techniques have been developed to provide optimum ion fill factor for ion trap mass spectrometers that have to operate over a substantial range of sample concentrations.

For example, U.S. Pat. No. 5,107,109 describes a method of operating an ion trap mass spectrometer wherein the fast single MS prescan is used to evaluate the total number of ions trapped during a fixed prescan ionization time. The ionization time for the main analytical scan is adjusted based on the total number of ions trapped during the prescan. The disadvantage of this method is that it is based on the total number of ions obtained in a fast prescan even though the main scan can be a MS/MS scan, resulting in much lower number of ions left in the trap after performing the second MS step in the MS/MS sequence.

Another approach to control the number of accumulated ions is utilized in a commercially available ion trap mass spectrometer from Agilent Technologies Inc. In this method, the data obtained from the previous scan are used to predict the ionization time for the next scan. This method, theoretically, allows one to predict the ionization time for the MSn scans with more certainty, since it is based on the final value of the signal in MSn scans. However, it is difficult to implement this technique with "bright" or concentrated ion sources due to the vast differences in the optimum number of ions that should be injected into an ion trap in the different modes of operations. For example, the ionization time for the standard calibration mix in a single MS mode is typically around 100 microseconds. On the other hand the ionizations time is adjusted to 300 milliseconds while performing a sensitivity test in MS/MS mode with 10 pg of Reserpine sample. If one assumes that a 10 times "brighter" (compared to commercial), ion source is installed on the system then in MS/MS mode, i.e. full scan, the ionization time will be scaled to about 30 milliseconds, resulting in improved sensitivity in this mode. However, in the single MS mode, i.e. full scan, the ionization time also would have to be reduced to 10 microseconds, which is beyond the linearity range for most of the conventional ion optical gating schemes, thus making single MS mode non operational with the "brighter" ion source.

What is needed is a system for selectively delivering a substantially reduced quantity of ions to the ion trap of a mass spectrometer from a source of bright or concentrated ions. A reduced number of ions delivered to the ion trap would enable the ion trap to operate at optimum efficiency in single MS, MS/MS, and MSn modes for concentrated samples.

BRIEF SUMMARY OF THE INVENTION

The invention comprises an ion delivery system for a mass spectrometer having an ionization source for producing an ion stream, an ion trap, and an ion guide. The ion delivery system includes gating apparatus for the ion stream and focussing apparatus for the ion stream between the ion guide and the ion trap of the mass spectrometer. The invention also comprises a method of delivering ions from a bright or concentrated ion source to the ion trap. A stream of ions from the ion source are guided to gating apparatus which delivers a pulse of ions. The pulse of ions is selectively focused to the ion trap for selectively controlling the number of ions in each pulse delivered to the trap.

BRIEF DESCRIPTION OF THE DRAWINGS

The character of the invention, however, may be best understood by reference to one of its embodiments in a mass spectrometer, as illustrated by the accompanying drawings, in which.

DETAILED DESCRIPTION OF THE INVENTION

Figure 1:
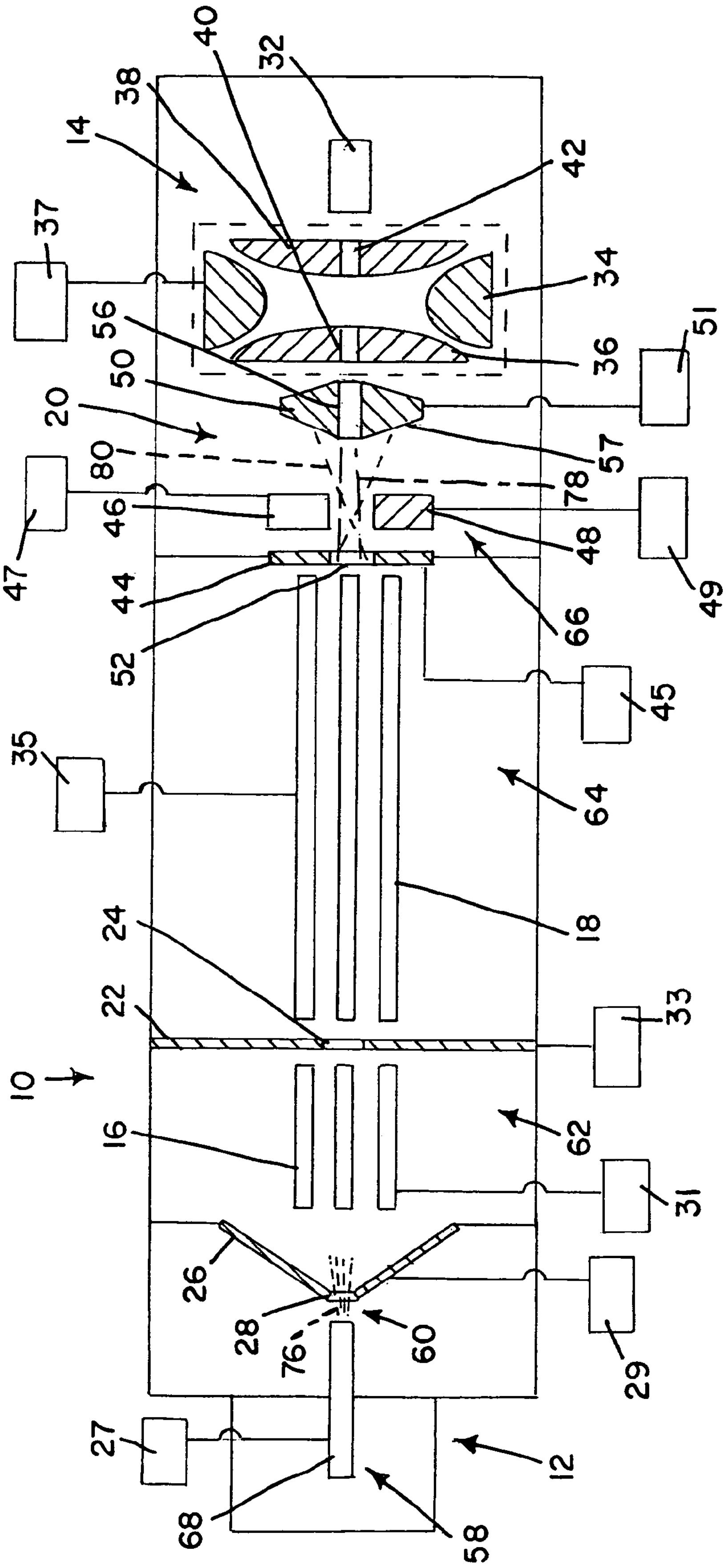
FIG. 1 is a simplified schematic view of a quadrupole ion trap mass spectrometer to which the ion delivery apparatus of the present invention is applied.

Referring to FIG. 1 of the drawings, an example of mass spectrometer to which the present invention is applied is generally indicated by the reference numeral 10. Mass spectrometer 10 includes an ionization source, generally indicated by the reference numeral 12, a quadrupole ion trap, generally indicated by the reference numeral 14, a first octapole ion guide 16, a second octapole ion guide 18 and a sensor 32. The ion delivery apparatus of the present invention is generally indicated by the reference numeral 20 and is located between the ion guide 18 and the ion trap 14.

The ion guide 16 is separated from the ion guide 18 by a partition plate 22 that has an aperture 24. A skimmer 26 is located in between the ionization source 12 and the ion guide 16 and has an aperture 28. The ion trap 14 includes a ring electrode 34 and two end caps 36 and 38. End cap 36 has an entrance opening 40. End cap 38 has an exit opening 42 facing the detector 32. End cap 34 is connected to a voltage source 37.

The ion delivery apparatus means 20 includes a focusing lens 44, focusing/gating lenses 46 and 48 and an aperture lens 50. Focusing lens 44 has an aperture 52. Aperture lens 50 has an aperture 56 that is aligned with aperture 52. Lens 50 has a deflecting surface 57 that faces lens 44 and slopes away from lens 44 outwardly from aperture 56 which it surrounds. Lenses 46 and 48 function to trap ions from the ion stream and release said ions in pulses toward the aperture lens 50. Ions that are focussed toward aperture 56 pass through the aperture and ions focussed away from the aperture 56 are deflected outwardly from the ion delivery system 20 by the surface 57.

The ionization source 12 is located in an atmospheric pressure region 58. The region in front of the aperture 28 of the skimmer 26 represents a first vacuum region, generally indicated by the reference numeral 60. The first ion guide 16 is located in a second vacuum region, generally indicated by the reference numeral 62. The second ion guide 18 is located in a third vacuum region, generally indicated by the reference numeral 64. The gating means 20 are located in a fourth vacuum region, generally indicated by the reference numeral 66. The air pressure regions recited in this application are connected to conventional pumps, not shown, normally used for mass spectrometers.

The ionization source 12 may be any ion source known in the art that can be used for generating ions from an analyte sample and for delivering them to a mass spectrometer system. Examples of such ionization sources include atmospheric pressure ionization (API) sources, such as electrospray (ESI), atmospheric pressure chemical ionization (APCI) and atmospheric pressure photoionization (APPI) sources. The analyte sample may be in liquid or gas form, for example, and is introduced into the ion source 12 by means well known in the art. The ion source 12 communicates with an interface 68 that comprises functions of transmitting ions from the ion source 12 to the mass spectrometer system and, optionally, allowing a reduction of gas pressure from that of the ion source 12 to that of the mass spectrometer system. Interface 68 may be an orifice, a capillary, a tube, a passageway or any other such device for ion transport and, optionally, pressure reduction. The interface 68, skimmer 26, first conduit 16, plate 22 and second conduit 18 are connected to conventional electrical power sources and controls represented by blocks 27, 29, 31, 33 and 35, respectively, in a manner well known in the art of mass spectrometers to produce the electrical potential, voltages and timing described in the examples of systems described in the application. In the example shown in FIG. 1, interface 68 generates ions toward the skimmer 26 in the form of an electrospray 76. The liquid droplets formed by spraying contain ions concerned with substances as an object for analysis.

Ions pass from the atmospheric pressure region 58 through the tube 68 into the first vacuum region 60 and pass through the aperture of the skimmer 26 into the first ion guide 18 in the second vacuum region 64. Ions are transferred through the ion guide 16 and exit through aperture 24 of plate 22 to the second ion guide 18 in vacuum region 64. Ions exiting ion guide 18 enter the gating and scaling optics 20.

The first ion guide 16 may be a radio frequency (RF) ion guide, or it may be any other type of ion guide, such as, by way of example and not limitation, a direct current (DC) ion guide, a stacked ring ion guide or an ion lens system. If it is an RF or a DC ion guide, it may comprise a multipole structure. Similarly, the second ion guide 18 may be of any type of ion guide, with examples similar to those given for ion guide 16. In some exemplary systems incorporating the invention, first ion guide 16 may be omitted.

The ion delivery apparatus 20 operates to introduce ions from the ion stream into the ion trap 30 in pulses. The pulse frequency can also be controlled in a conventional manner. the lenses 44, 46, 48 and 50 are connected to a voltage sources 45, 47, 49, and 51, respectively. The voltage on each of the lenses can be controlled independently of the voltages on the other lenses. The scaling of the ions in each of the ion pulses depends on the voltage setting of the lenses. It is possible to transfer the whole ion beam to the ion trap in each pulse by focussing the pulse entirely at the aperture 56 as indicated by the dot and dash lines 78 or only a fraction of the ion beam as indicated by the dotted lines 80. The focusing or defocussing of the ion beam is achieved by changing the voltages on lenses 44, 46, 48 and 50.

In the single MS mode, the ion trap operates in repeating cycles of ion accumulation and scanning to obtain a series of mass spectra. In this mode, the scaling ion optics is set to transmit only a fraction of the ion beam into the ion trap, while the ion gating is performed in optimum linear range of about 10 microseconds to 500 milliseconds. In one mode of the invention, gating can be performed by deflecting the beam, this is accomplished by applying differential voltage to the focusing/gating lenses 46 and 48. In this mode, the accumulation time can be adjusted by either using previous scan data or by using a first prescan data to evaluate the optimum number of ions to be injected into the trap for the next scan. In the case of using fast prescan, it may be beneficial to have a different fraction of the ion beam to be transferred by the scaling ion optics into the trap mass analyzer 14. If a larger fraction of the ion beam is transferred during the prescan then it is possible to shorten the accumulation time for the prescan and therefore, to improve duty cycle and sensitivity for the technique. Then the scaling factor can be taken into account to calculate the accumulation of time for the MS scan.

In the MS/MS mode and MSn mode, the scaling ion optics is set to transmit a larger portion of the beam (or even the complete beam) compared to a single MS mode. In this mode, ions of interest are isolated in the trap and then fragmented. During the isolation portion the vast majority of the background ions are ejected from the trap before performing the mass scanning. Therefore, the initial number of injected and trapped ions can be about 10 to 100 times higher compared to single MS. This makes it possible to operate with a much stronger ion beam delivered through the scaling optics. Since the initial trap capacity in this mode can be considered about 10 to 100 times higher compared to single MS mode and the ion beam can be transferred unattenuated into the ion trap, the gating time for the trap still can be maintained in the same favorable linear range of about from 10 microseconds to 500 milliseconds, as for single MS mode. This allows one to inject about 10 times more ions in MS/MS mode compared to the prior art methods with a “bright” ion source, thus dramatically improving the sensitivity of the technique. In a single MS mode, dynamic range and linearity are still maintained since only a fraction of the ion beam is delivered to the ion trap. Again, the data from a fast prescan or a data from the previous scan can be used along with the scaling factors to calculate the appropriate accumulation time for the next scan.

In the auto MS mode, the mass spectrometer is operating in a screening single MS mode. Based on the user preset condition, the instrument is switched into MS/MS or MSn mode of operation for a certain number of scans and is then returned back to single MS mode. According to the present invention, the ion beam is attenuated during the single MS mode of operation and used with less or no attenuation for the MS/MS ro MSn modes of operation within auto MS mode as described above.

It is recognized that different arrangements for the scaling ion optics can be used as is well known in a prior art. Also, the gating element can be decoupled from the scaling ion optics. The scaling optics need not necessary be in the ion trap proximity, but anywhere in a way that it will affect ion production efficiency. It is also recognized that the ion trap end cap can be used as a part of the scaling optics. In this case, its entrance aperture can be used to skim the defocussed ion beam.

It is recognized that the method of the present invention can be used with different ion trap analyzers including, but not limiting to, quadrupole ion trap, linear trap and ion cyclotron mass analyzer. Also the gating time can be in different time ranges than those described in the example described above, since it depends on the particular gating ion optics, the ion capacity of the mass analyzer and the ion flux generated by the ion source.

The present invention provides a way to achieve different ion fill rates for the ion trap mass analyzer in single MS and MSn modes of operations, where n starts from 2 and up to practical limit of about 20. This provides an improved dynamic range in single MS and MSn modes of operations while gating the ion source in the optimum linear range for the gating timing.

It is recognized that different ion sources can be used with the current invention including, but not limiting to, electron ionization, electrospray ionization, MALDI, thermospray, glow discharge ionization, photo ionization, chemical ionization and inductively coupled plasma ionization.

Figure 2:
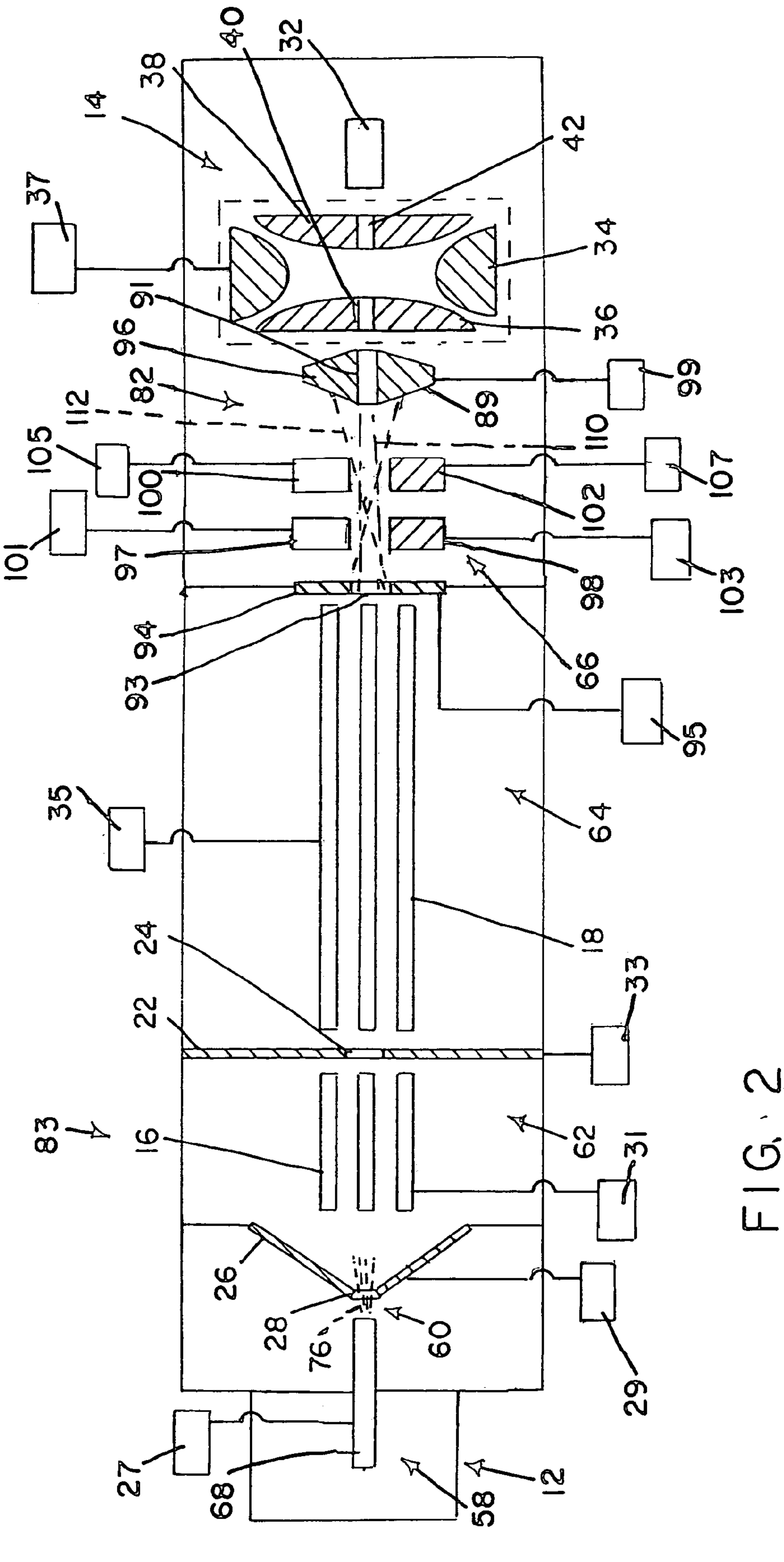
FIG. 2 is a view similar to FIG. 1 showing a modified ion delivery apparatus.

Referring to FIG. 2, there is shown a modified ion delivery apparatus, generally indicated by the reference numeral 82, as applied to an ion trap mass spectrometer, generally indicated by the reference numeral 83.

The mass spectrometer 83 includes ionization source 12, skimmer 26, ion guides 16 and 18, ion trap 14 and detector 32 described in connection with the embodiment of FIG. 1.

The ion delivery apparatus 82 can be adapted to be located between the ion guide 18 and the ion trap 14. Apparatus 82 may include a focusing lens 94 adjacent the downstream end of the ion guide 92, an aperture lens 96 located adjacent the entrance to the ion trap 14, gating lenses 97 and 98, and focusing lenses 100 and 102. In the example shown in FIG. 2, the lenses 97 and 98 are located between lenses 94 and 96 and adjacent lens 94. The lenses 100 and 102 shown in FIG. 2 are located between the lenses 97 and 98 and the lens 96. Focussing lens 94 has an aperture 93. Aperture lens has an aperture 91 that is aligned with aperture 93 and a deflection surface 89 that slopes away from lens 94 outwardly from aperture 91 which it surrounds. Lenses 94, 96, 97, 98, 100 and 102 are connected to voltage sources 95, 99, 101, 103, 105, and 107, respectively, so that the voltages to each of the lenses can be controlled independently.

The ion stream from the ion guide 18 passes through the aperture 93 of lens 94 to the gating lens 97 and 98 which deliver pulses of ions from the ion stream toward the ion trap 14. Each pulse of ions is selectively focussed by the focussing lenses 100 and 102. It is possible to transfer the entire pulse of ions through the aperture 91 of the lens 50 to the ion trap as indicated by the dot and dash lines 110 or only a fraction of the pulse as indicated by the dotted lines 112. The focussing or defocussing the ion beam is achieved by changing the electric potential of the lenses 94, 96, 97, 98, 100 and 102.

What is claimed is:

1. An ion delivery system for a mass spectrometer having an ionization source for providing a continuous stream of ions, and ion trap, a detector and an ion guide for guiding said continuous ion stream from the ionization source toward the ion trap, said ion delivery system comprising:

(a) gating apparatus adapted to be placed between said ion guide and said ion trap for receiving said continuous ion stream and for projecting ions from said continuous ion stream in a stream of ion pulses toward said ion trap; and (b) scaling apparatus operatively connected to said gating apparatus for selectively controlling the number of ions in each of said ion pulses delivered to said ion trap.

2. The ion delivery system as recited in claim 1, wherein said scaling apparatus comprises at least one ion lens apparatus.

3. The ion delivery system as recited in claim 1, wherein said gating apparatus comprises at least one ion lens apparatus.

4. The ion delivery system as recited in claim 1, wherein said scaling apparatus comprises:

(a) a first ion lens adapted to be located between said ion guide and said gating apparatus; and (b) a second ion lens adapted to be located between said gating apparatus and said ion trap and for functioning in conjunction with said first ion lens.

5. The ion delivery system as recited in claim 4, further comprising an aperture ion lens adapted to be placed between said second ion lens and said ion trap.

6. The ion delivery system as recited in claim 1, wherein said scaling apparatus is a ion focussing lens adapted to be placed between said ion guide and said gating apparatus and said gating apparatus comprises an ion lens that is in a cooperating ion focussing relationship with said ion focussing lens for focussing said ion pulses.

7. The ion delivery system as recited in claim 6, further comprising an aperture lens adapted to be placed between said gating apparatus and said ion trap.

8. The ion delivery system as recited in claim 7, wherein said aperture lens comprises an aperture that is aligned with the ion lenses of said scaling apparatus and said gating apparatus for receiving at least a portion of each of said ion pulses focussed toward said aperture lens, said aperture lens comprising a deflection surface about said aperture.

9. The ion delivery system as recited in claim 8, wherein said deflection surface slopes away from said aperture.

10. A mass spectrometer comprising:

(a) an ionization source for producing a continuous stream of ions from a sample compound to be analyzed;

(b) an ion trap;

(c) gating apparatus adapted to be placed between said ion guide and said ion trap for receiving said continuous ion stream and projecting ions from said continuous ion stream in a stream of ion pulses toward said ion trap; and (d) scaling apparatus operatively connected to said gating apparatus for selectively controlling the number of ions in each of said ion pulses delivered to said ion trap.

11. The mass spectrometer as recited in claim 10, wherein said scaling apparatus comprises at least one ion lens apparatus.

12. The mass spectrometer as recited in claim 10, wherein said gating apparatus comprises at least one ion lens apparatus.

13. The mass spectrometer as recited in claim 10, wherein said scaling apparatus comprises:

(a) a first ion lens adapted to be located between said ion guide and said gating apparatus; and (b) a second ion lens adapted to be located betweens said gating apparatus and said ion trap and for functioning in conjunction with said first ion lens.

14. The mass spectrometer as recited in claim 13, further comprising an aperture ion lens adapted to be placed between said second ion lens and said ion trap.

15. The mass spectrometer as recited in claim 10, wherein said scaling apparatus is a ion focussing lens adapted to be placed between said ion guide and said gating apparatus and said gating apparatus comprises an ion lens that is in a cooperating ion focussing relationship with said ion focussing lens for focussing said pulses.

16. The mass spectrometer as recited in claim 15, further comprising an aperture lens adapted to be placed between said gating apparatus and said ion trap.

17. The mass spectrometer as recited in claim 16, wherein said aperture lens comprises an aperture that is aligned with the ion lenses of said scaling apparatus and said gating apparatus for receiving at least a portion of each of said pulses focussed toward said aperture lens, said aperture lens comprising a deflection surface about said aperture.

18. The mass spectrometer as recited in claim 17, wherein said deflection surface slopes away from said aperture.

19. A method of analyzing ions in a mass spectrometer that includes an ion trap, comprising:

(a) guiding a continuous stream of ions toward said ion trap;

(b) gating said stream for delivering said continuous stream of ions in a stream of ion pulses of a predetermined time duration to said ion trap mass analyzer;

(c) adjustably controlling the quantity of ions in each of said ion pulses to be delivered to said ion trap.

20. The method as recited in claim 19, wherein said step of adjustably controlling the quantity of ions in each of said ion pulses comprises adjustably focusing said ion pulses through the opening of an aperture lens located in from of said ion trap mass analyzer so that a predetermined portion of said ion pulses passes through said aperture for each of said ion pulses.

21. A mass spectrometer comprising:

(a) an ionization source for producing a continuous ion stream from a sample compound to be analyzed;

(b) gating apparatus for receiving said continuous ion stream and projecting ions from said continuous ion stream in a stream of ion pulses;

(c) an ion trap for receiving said stream of ion pulses and conducting at least on single MS scan of one of said ion pulses to obtain a series of mass spectra and at least one MS/MS scan of one of said ion pulses in which ions of interest are isolated in the trap and then fragmented and all other ions ejected from the trap; and (d) scaling apparatus operably connected to said gating apparatus and said ion trap for selectively controlling the number of ions in each ion pulse delivered to said ion trap from said stream of ion pulses, said scaling apparatus being effective to transmit a fraction of the ion pulse delivered to the ion trap for said single MS scan and to transmit a portion of the ion pulse delivered to said ion trap for said MS/MS scan, said portion being substantially larger than said fraction.

22. The mass spectrometer as recited in claim 21, wherein said portion of the ion pulse is the entire ion pulse.

23. The mass spectrometer as recited in claim 21, wherein said gating apparatus is adjustable for selectively controlling the frequency of said ion pulses.

24. A method of analyzing ions in a mass spectrometer that includes an ion trap, comprising:

(a) producing a continuous stream of ions;

(b) converting said continuous stream of ions into a stream of ion pulses;

(c) adjustably focusing each of said ion pulses into said ion trap for selectively controlling the number of ions in each of said ion pulses that enters said ion trap; and (d) conducting a scan of each of said ion pulses to analyze the ions in the pulse.

25. The method as recited in claim 24, wherein said ion trap conducts at least one single MS scan of an ion pulse to obtain a series of mass spectra and at least one MS/MS scan of an ion pulse in which ions of interest are isolated in the trap and then fragmented and all other ions are ejected from the ion trap and, wherein said method further comprises:

(a) focussing the ion pulse delivered to said ion trap for said single MS scan so that a fraction of the ion pulse enters said ion trap; and (b) focussing the ion pulse delivered to said ion trap for said MS/MS scan so that a portion of the ion pulse that is substantially larger then said fraction enters said ion trap for said MS/MS scan.

26. The method as recited in claim 25, wherein said portion of the ion pulse is the entire ion pulse.

27. The method as recited in claim 25, wherein the frequency of said stream of pulses is substantially the same for said single MS scan and for said MS/MS scan.

28. The method as recited in claim 25, wherein the frequency of said stream of pulses is within the same optimum linear range for single MS scan and for said MS/MS scan.

29. The method as recited in claim 25, wherein said optimum linear range is from about 10 microseconds to about 500 milliseconds.

30. The method as recited in claim 25, wherein said MS/MS scan is a MS/MSn scan.

* * * * *